March 2, 1954

R. C. MOORE 2,671,129

ELECTRICAL SYSTEM

Filed June 11, 1951

INVENTOR.
ROBERT C. MOORE
BY
Allen V. Hazeltine
ATTORNEY

UNITED STATES PATENT OFFICE 2,671,129

ELECTRICAL SYSTEM

Robert C. Moore, Erdenheim, Pa., assignor to Philco Corporation, Philadelphia, Pa., a corporation of Pennsylvania Application June 11, 1951, Serial No. 230,889

10 Claims. (Cl. 178—5.4)

Figure 1:
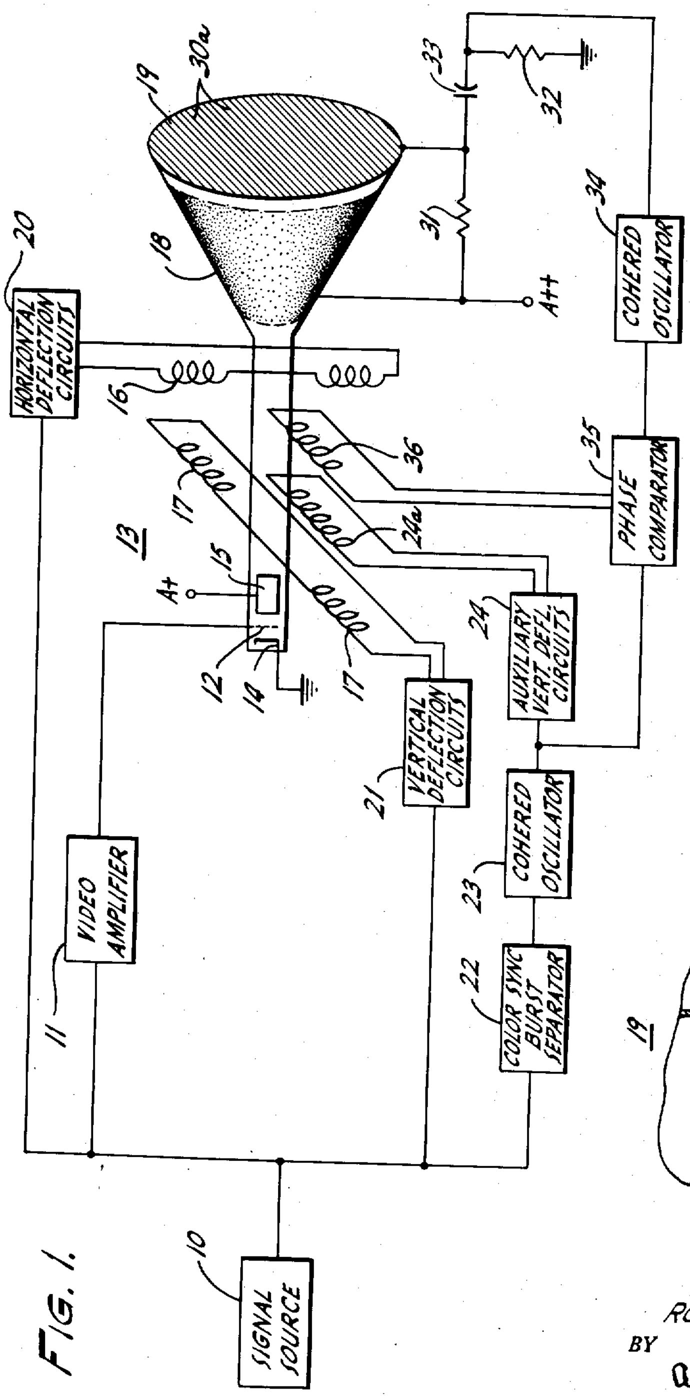

The present invention relates broadly to systems for displaying information in visible form.

More particularly, it relates to cathode-ray tube systems which are supplied with a signal having different portions representative of different types of intelligence and which utilize this signal to control the intensity of the cathode-ray beam at the same time that the latter is swept across intervals of the cathode-ray tube screen adapted to display the aforesaid different types of intelligence. In such systems, accurate registry between the occurrence of intelligence representative portions of the signal and display intervals is clearly of paramount importance.

Systems which operate in the aforesaid manner are strikingly exemplified by the so-called dot-sequential color television systems, which are characterized by the employment of transmitted signals whose amplitude is, in rapid succession, indicative of three primary color components, such as red, green and blue, for example, of minute adjacent elements of a televised scene. To obtain such a signal, the scene to be televised may be viewed simultaneously by three different television cameras, respectively equipped with red, green and blue optical filters. These cameras scan the scene in synchronism and produce continuous video output signals whose respective amplitudes vary in accordance with the corresponding color content of the scene. These three output signals are then successively sampled, each at a very high rate, such as, for example, 3.5 million times per second, after which the sampled signals are combined and filtered so as to reject all signal components having a frequency above, say, 4 megacycles. The composite signal resulting from these various operations has a low frequency amplitude-varying component corresponding to the average brightness of the televised scene, and a high frequency component of 3.5 megacycles nominal frequency, but modulated in amplitude and phase in accordance with the coloration of the scene. At three time spaced intervals during each cycle of this 3.5 megacycle component, the total amplitude of the composite signal will thus be representative of information respecting the red, green and blue color components respectively of the televised scene. With the present standard horizontal scanning rate of cathode ray tube receivers at 15.75 kilocycles, this corresponds to approximately 186 intervals, during each horizontal sweep traversal of the receiver tube beam, at which the received signal is representative of any one color component.

Receiver systems are known, for use with such dot-sequential systems, which include a cathode ray tube having a screen on which minute phosphor elements are adjacently deposited in such a manner that every third element emits, in response to electron beam impingement thereon, light of one primary color, say red, for example, while the intervening elements emit green and blue light, respectively. The electron beam is then intensity-modulated by the received video signal and deflected across these elements so that it successively traverses all of the elements lying across the path of each horizontal scanning line.

One configuration which these screen elements have frequently been given is that of narrow stripes whose longer dimensions extend transversely to the direction of the horizontal scanning lines.

Proper color rendition of the televised scene was obtained with this transversely striped screen only if the electron beam was incident upon a stripe emissive of a certain color at exactly the same interval at which the beam intensity modulation was representative of intelligence respecting that color or, which is the same thing, when the received signal was representative of such intelligence.

Difficulties were encountered in the practical realization of this objective because of nonlinearity of the cathode ray tube sweep circuits, unequal spacing of the light-emissive stripes across the scanning lines, and variations in the rate of occurrence of intelligence representative portions of the received signal proper due to varying phase delay in the transmitter-receiver path.

To overcome these difficulties, there were provided means for deriving, from the cathode-ray tube screen structure, indications of beam impingement upon certain phosphor stripes. These indications were then utilized to control the horizontal scanning rate of the beam across the stripes so as to compensate for improper color registry produced by the aforedescribed variations. Since each horizontal scan is completed in 1/15,750 seconds, it is apparent that very little time is available in which to effect this compensation, so that the control action must be very rapid.

Note that it is characteristic of dot-sequential systems that their transmitted and received signals are representative of intelligence respecting different colors at several intervals during each horizontal line scanning period. This makes it necessary to dispose the receiver tube color stripes transversely to the horizontal scanning lines, if all of the intelligence representative portions of the signal are to be utilized.

There are also known so-called line-sequential color television systems which are characterized in that the transmitted and received signals are representative of intelligence respecting a single color during an entire horizontal line scanning period. To display such a signal, the differently colored stripes of the receiver cathode-ray tube are arranged longitudinally of the direction of horizontal beam deflection, so that the beam remains impingent upon a single color stripe during any one horizontal line scan. This system is, however not suitable for the display of dot-sequential signals whose color representativeness changes during the scanning of each line.

It is, accordingly the principal purpose of the invention to provide a color television receiver which receives dot-sequential television signals and displays them by modulating an electron beam scanning transversely across the color stripes of the cathode-ray tube screen, and which nevertheless retains the superior accuracy of beam registry provided by a system whose beam scans longitudinally of these stripes.

It is another object of the invention to provide means for displaying a dot-sequential signal on a line sequential cathode ray tube screen.

It is another object of the invention to provide a novel scanning pattern for the beam of a cathode-ray tube having color stripes on its screen, whereby a dot-sequential signal is displayed even though the stripes are disposed longitudinally of the horizontal scanning direction.

It is another object of the invention to provide improved means for monitoring cathode-ray beam position in dot-sequential color television receivers and to utilize the monitoring indications so as to correct improper beam positioning.

It is still another object of the invention to provide a dot-sequential color television receiver which includes means for utilizing indications of cathode-ray beam position to control the vertical beam deflection so as to correct improper beam positioning.

It is a feature of apparatus embodying my invention that color registry is inherently entirely independent of the linearity of the horizontal deflection circuits.

To achieve the foregoing objects, as well as others which will appear, I provide the cathode ray tube of my receiver with a screen on which colored light emissive phosphor stripes, cyclically recurrent in the three primary colors, are disposed as in receivers for the line-sequential system, namely longitudinally of the line scanning direction. I also provide so-called "indexing stripes" whose detailed nature will be explained hereinafter and which parallel the light-emissive elements at intervals of every three such phosphor stripes. Note, in this connection, that line scanning is conventionally carried out by deflecting the electron beam of the cathode ray tube in two mutually perpendicular directions by the so-called horizontal and vertical deflection systems, respectively. As is well known, the direction of beam deflection produced by the horizontal deflection system acting alone is not exactly the same as the line scanning direction, but instead forms a small angle therewith. The deflection produced by the vertical deflection system, on the other hand, is at right angles to the direction of deflection produced by the horizontal deflection system and forms, therefore, the complementary angle with the line scanning direction. Thus the line scanning direction is, in effect, the resultant of the beam deflections produced by the horizontal and vertical deflection systems acting jointly. As is well known, the angle between the horizontal deflection direction and the line scanning direction depends upon the ratio of the horizontal deflection rate to the vertical deflection rate, the angle becoming smaller as this ratio is increased. In accordance with the invention, this ratio, and with it the inclination from the horizontal of the scanning lines, is chosen so that consecutive sweep traces of the beam are separated by approximately the vertical space occupied by three phosphor stripes and one indexing stripe. By virtue of this arrangement, the beam, which follows say the red stripe during its initial sweep traversal of a scanning field, will thereafter follow the red stripe of each group of three differently color-emissive stripes, as accurately as the sweep linearity will permit.

Further in accordance with the invention, there is superimposed, upon the deflection produced by one of these systems, rapidly reciprocating auxiliary deflection of constant amplitude and of a frequency substantially equal to the rate of recurrence of intervals at which the received signal is representative of intelligence respecting one particular color. The amplitude of this auxiliary deflection is chosen so that it extends over the space occupied by three adjacent phosphor stripes and at least one indexing stripe, this space being measured in the direction of auxiliary deflection. While this is not essential to the realization of the invention, for reasons which will appear, the auxiliary deflection direction is preferably chosen parallel to the vertical deflection direction. As a result of the application of this auxiliary deflection the beam will not only traverse its normal horizontal scanning path due to the combined action of the conventional horizontal and vertical deflection systems but will, in addition, carry out a reciprocating vertical displacement across a group of three differently colored light emissive screen elements. By selecting this auxiliary deflection frequency as hereinbefore specified, the beam is now made to traverse three differently colored light emissive elements during the time of occurrence of three consecutive signal intervals at which the signal is representative of information respecting the three different primary colors.

In the illustrative case hereinbefore assumed, in which the longitudinal and vertical deflection systems were so proportioned as to sweep the beam along consecutive red emissive phosphor stripes, this auxiliary deflection will then repeatedly deflect the beam from its path along the red stripe, causing it, during each deflection cycle, to traverse the nearest green, blue and indexing stripes as well. Since this auxiliary deflection is of relatively small amplitude, it is an easy matter to give it such form that the beam will traverse the differently colored stripes at the same time spaced intervals at which the signal is representative of different color information and so on consecutively for the other colors and in the same sequence. Since the beam, during each cycle of auxiliary deflection, also traverses at least one indexing stripe, the desired registry between intelligence-representative portions of the received signal and beam incidence upon corresponding colored light emissive elements will be evidenced by one particular pattern of the signals produced by the indexing stripes. Means are then provided for sensing departures from this desired pattern and for producing a corrective deflection in a direction parallel to the auxiliary deflection direction so as to restore the desired indexing signal pattern which, so long as it prevails, is conclusive indication of registry between the aforesaid signal portions and beam incidence intervals.

Note that the manner in which the auxiliary deflection signal is produced is immaterial for the purposes of my invention, so long as it provides the aforedescribed beam impingement registry. In practice, however, a suitable source of such signal will be a received signal component often provided in dot-sequential color television systems and called the color synchronizing burst. This burst is a train of a few cycles of an oscillation superimposed on the trailing half of each line blanking pulse and of a frequency equal to the sampling rate. It is characterized in that its phase is independent of color information and indicative of the time of occurrence of video signal intervals respecting one particular color. Thus its frequency and phase provide a reference with respect to which color information representative signal portions may be located. In this respect, the color synchronizing bursts provide a particularly useful reference signal inasmuch as they undergo all of the varying phase delays to which the video signal is subject during transmission.

When utilizing these color bursts to produce the auxiliary deflection signal, the latter is given the same frequency as the oscillation of which the bursts consist, and a phase which is fixed relative to the phase of these oscillations.

Figure 2:
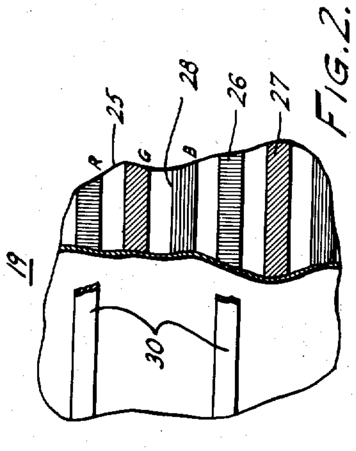
Figure 3:
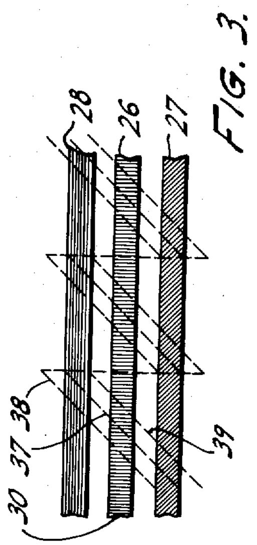

The features and operation of specific apparatus provided for the performance of the above-described functions will be more readily understood from a consideration of the detailed discussion which follows when taken in conjunction with the accompanying drawings wherein:

Figure 1 is illustrative of a preferred embodiment of my invention in a color television receiver;

Figure 2 is an enlarged, fragmentary view of a portion of the screen structure of the cathode ray tube used as the signal display device in the embodiment of Figure 1 which will be useful in the explanation of certain aspects of the operation of this embodiment; and Figure 3 shows certain important relationships between the position of elements of the screen structure shown in Figure 2 and the scanning traversal of these elements by the electron beam.

There is shown, in Figure 1, to which more particular reference may now be had, a rectangle 10, designated "signal source" which will ordinarily comprise such conventional components of a television receiver as the antenna, tuner, radio frequency amplifier, converter, intermediate frequency amplifier and video detector. The output of this signal source 10 will then be a video signal whose amplitude is, at time-spaced intervals, representative of information respecting the red, green and blue color content of the scene being televised. At intervals of one receiver scanning line, this video signal will be briefly obliterated by a conventional blanking pulse upon the leading portion of which there is, as is usual, superimposed a horizontal synchronizing pulse, while upon the trailing portion thereof is pedestaled the aforementioned color synchronizing burst. In the exemplary case under consideration this burst is at a frequency of 3.5 megacycles. As has been indicated, the frequency and phase of this burst provide needed information at the receiver respecting the rate of occurrence of picture intelligence representative portions of the composite video signal and, furthermore, indicate at which interval during each cycle of this color signal the latter is representative of intelligence respecting one particular color. Since the order of occurrence of the intervals at which the color signal component is representative of information respecting the different color components is usually maintained constant, the indication provided by the synchronizing burst phase respecting one of these colors is sufficient to define the times of occurrence of the portions representative of intelligence of the other two colors, inasmuch as these follow the first one in the same order and at predetermined spacings. This color synchronizing burst is utilized in practicing the invention in a manner hereinafter described.

The composite video signal which appears at the output of signal source 10, or at least such portions thereof as are representative of color information, are then supplied to conventional video amplifier 11 and thence to the beam intensity control grid 12 of cathode ray display tube 13, where they serve to modulate the intensity of the electron beam emitted by cathode 14 in the manner common to color television receivers. Cathode ray tube 13 is further equipped with a conventional accelerating anode 15 connected to a suitable source of unidirectional positive potential A+, as well as with vertical deflection coil 16, horizontal deflection coil 17, a second anode 18 which is connected to a source of positive second anode potential A++, and a screen structure 19 whose features are described in detail hereinafter. While this particular cathode ray tube has been shown to be equipped with electromagnetic deflection systems, it will be understood that the invention is by no means limited thereto and that electrostatic deflection systems may be used in their place in accordance with the well known interchangeability between electrostatic and electromagnetic deflection systems. At the same time that the output of signal source 10 is supplied to video amplifier 11, it is also supplied to conventional horizontal deflection circuits 20 which respond thereto in the usual manner to provide a sawtooth current wave for application to horizontal deflection coils 17 which, in turn, produce deflection of the beam in a horizontal direction across the screen structure 19. The composite video signal derived from signal source 10 is also supplied to conventional vertical deflection circuits 21 which are responsive thereto to provide a suitable sawtooth wave of output current for application to vertical deflection coil 16 where it acts upon the electron beam of the cathode ray tube 13 to deflect the latter repetitively in a vertical direction across screen structure 19. Still another circuit to which the composite video output signal of signal source 10 is supplied in color synchronizing burst separator 22. This circuit is characterized by being responsive only to the aforedescribed color synchronizing bursts and being substantially non-transmissive of all other components of the composite video signal. Such a separator may take any one of several known forms; for example it may consist of an amplitude separating circuit followed by a filter, the separating circuit being one which rejects all signals below the blanking pulse level, thereby eliminating all but the horizontal synchronizing pulses and the color synchronizing bursts immediately. The filter is designed to transmit signals of the sampling frequency, in this case 3.5 megacycles, to the substantial exclusion of all other signals. Thereby the horizontal deflection synchronizing pulses are also rejected, leaving, at the output of this filter, only the separated color synchronizing bursts. Since these bursts are intermittent in character and since, for reasons which will appear, it is desired to obtain a continuous signal having the same frequency and phase characteristics as the color synchronizing bursts, these latter are supplied, after separation, to a cohered oscillator 23 which produces just such a continuous signal having the same frequency and phase characteristics as the received color synchronizing bursts. There is thus available, at the output of cohered oscillator 23, one of the signals hereinbefore described as being required for the operation of my system, namely a signal whose frequency is indicative of the rate of occurrence of color information representative portions of the received video signal, and whose phase is indicative of the relative time of occurrence of the intervals representative of different color information. This ouput signal of cohered oscillator 23 is now, first of all, supplied to auxiliary vertical deflection circuits 24 which produce a sawtooth signal wave of current of the same frequency as the output signal of cohered oscillator 23 and having a gradually and preferably linearly rising portion, followed by an abruptly falling portion.

Conventional circuits are known which will produce sawtooth current waves of any desired frequency and from these specific arrangements for use as auxiliary vertical deflection circuits 24 may be selected. The current produced by auxiliary deflection circuits 24, and which has the form hereinbefore described is supplied to auxiliary deflection coil 24a where it produces a correspondingly varying magnetic field which, in turn, deflects the beam cyclically from the vertical position which it occupies by virtue of the main vertical deflection produced by vertical deflection circuits 21. Specifically, an auxiliary deflection signal having the form described as being produced by circuits 24 will cause the electron beam to depart slowly from its initial position during the rising portion of the current waveform. In the absence of main horizontal and vertical deflection the beam would then return almost instantaneously to the aforesaid initial position due to the sharply falling portion of the waveform. However during the time when one cycle of the auxiliary deflection takes place, the beam will have progressed by a small amount along its main vertical deflection path, as a result of which the beam, at the completion of a cycle of auxiliary deflection, will not actually return to the same vertical position which it occupied at the beginning of this cycle but will instead terminate at whatever vertical location is then determined by the main vertical deflection circuit. Similarly, some horizontal deflection of the beam by virtue of the horizontal deflection circuits 20 will have taken place during this one cycle of the auxiliary vertical deflection. As a result of the combined effects produced by this vertical and horizontal deflection, the resultant deflection pattern produced by the interaction of these two main deflection systems and of the auxiliary deflection system will be the ordinary scanning raster of a conventional cathode ray tube modified so that each scanning line actually consists of a large number of small amplitude sawtooth oscillations.

Inasmuch as the second signal required for the operation of my system is derived from the screen structure of the cathode ray tube 13, as hereinbefore generally indicated, it is in order now to describe this structure in more detail. Since the screen structure, which is generally designated by reference numeral 19 in Figure 1, is composed of numerous minute elements in close juxtaposition, an enlarged fragmentary section thereof has, for the sake of greater clarity of exposition, been reproduced in Figure 2, to which reference may now be had. Screen structure 19 is seen to be comprised of the face plate 25 of cathode ray tube 13, upon which there are deposited a plurality of closely spaced phosphor stripes 26, 27 and 28. Of these stripes, all those designated 26 are constituted so as to be emissive of red light in response to electron beam impingement thereon, while those designated 27 will emit green light in response to the same stimulus and those designated 28 will emit blue light. The manner in which such particular light emission is produced is well known and need not be further discussed here. Note that stripes emissive of light of any one of the three aforesaid colors are cyclically recurrent at intervals of every three stripes. Deposited over all of these phosphor stripes there is an extremely thin layer of some electron permeable material such as aluminum and on top of this aluminum layer 29 there are in turn deposited stripes which parallel the phosphor stripes and which are characterized by having a secondary electron emission ratio in response to beam impingement thereupon which is substantially different from that of the aluminum layer. These stripes 30 are known as indexing stripes and are conventionally made of some material having a high atomic number, such as gold for example. These indexing stripes 30 are normally disposed at intervals of three phosphor stripes. Thus, in the illustrative case under consideration, indexing stripes 30 are seen to be located directly above each red light emissive stripe 26. It is these indexing stripes 30 of Figure 2 which are schematically represented by single lines 30a shown on screen structure 19 in Figure 1. Furthermore, the number of such diagrammatically indicated indexing stripes 30a is in practice much greater than that shown, the number illustrated having been reduced to a nominal figure so that individual indexing stripes are distinguishable. With a standard 525 line system, there will, ordinarily, be over 500 such indexing stripes on the tube face, clearly a prohibitively large number for representation in the small space available.

Referring now to both Figures 1 and 2, the horizontal and vertical deflection circuits 20, 21 of my novel receiver system are preferably so proportioned that the beam, in the absence of any auxiliary vertical deflection, traces a path across the tube screen 19 following green light emissive stripes 27, these being, in each case, the stripes immediately below the red-light-emissive phosphor stripes, which latter, in turn, have superimposed thereon the indexing strips 30. If, in addition, the standard interlaced scanning system is adhered to, the beam will be made to follow every other green light emissive phosphor stripe during the scanning of one field, and it will further follow the intermediate alternate green light emissive stripes on the next successive field. The sawtooth current wave produced by auxiliary vertical deflection circuits 24, as hereinafter mentioned, is now applied to auxiliary deflection coil 24a with such a polarity as to produce upward deflection of the electron beam during the slowly rising portion of the wave, followed by a rapid, almost instantaneous downward sweep of the beam during the falling portion of the sawtooth wave. As has been indicated, the amplitude of this wave is chosen so that the beam excursion which it produces extends over a group of three adjacent phosphor stripes. Starting from any green stripe 27, therefore, the beam will sweep slowly across the next upwardly adjacent phosphor stripe, which happens to be the red stripe 26, and then across the upwardly adjacent blue stripe 28, after which it will return almost instantly to impingement upon the green stripes 27 from which its upward movement initiated.

This will appear more clearly with reference to Figure 3, where there is illustrated a single set of three adjacent phosphor stripes 26, 27 and 28, it being understood that an indexing stripe 30 is superimposed on the central stripe 26 of the set, so that the two are indistinguishable from the particular angle of view of the figure. Different paths which the electron beam may follow during a line scanning traversal are shown in this figure. Broken line 37 indicates the normal sawtooth path hereinbefore described which is seen to lead generally from left to right from the bottom of green stripe 27, across red stripe 26, to the top of blue stripe 28, after which it returns abruptly to the bottom of stripe 27 and thence resumes its next gradual upward sweep. During traversal of red light emissive phosphor stripe 26, the beam will, of course, also be impingent upon index stripe 30 which is superimposed thereon. As a result, the secondary emission current flowing to second anode 18 will increase considerably during the interval of beam impingement upon red light emissive phosphor stripe 26. This increased current flow will cause increased conduction through resistor 31, shown in Figure 1, which completes the return circuit between screen 19 and second anode 18. This surge of current is then applied, by way of pulse forming network 32, 33 to cohered oscillator 34 where it produces a substantially sinusoidal output signal having the same phase and frequency characteristics as the indexing signal derived from stripes 30. If, now, the vertical deflection produced by the main vertical deflection circuits 21 is of precisely the right value so that the path of the beam, due to auxiliary vertical deflection, is as shown by line 37 of Figure 3, then the beam can always be expected to traverse the indexing stripe 30 at the same time after the inception of each cycle of auxiliary deflection, this being the equivalent of saying that the phase of the signal produced by the indexing stripe will always be constant relative to the phase of the auxiliary vertical deflection signal. Observe now that, if the main vertical deflection should take place too slowly at any time, then the beam will be vertically displaced in an upward direction from its desired initial position and this initial upward displacement will be maintained throughout its deflection by the auxiliary deflection signal. Broken line 38 of Figure 3 shows the path of the beam under these conditions and indicates that the beam will traverse indexing stripe 30 sooner after the beginning of the auxiliary deflection cycle than would normally be the case. This, in turn, will produce a premature occurrence of the indexing signal, corresponding to a phase advance of the indexing signal relative to the auxiliary deflection signal. The opposite effect will take place if the main vertical deflection is too rapid, for then a downward error will appear in the beam position during its auxiliary vertical deflection, so that it will traverse indexing stripe 30 later than it would under conditions of accurate vertical deflection, thereby producing a phase delay of the indexing signal relative to the phase of the auxiliary vertical deflection signal. This condition is shown by broken line 39 of Figure 3.

Since such phase changes of the indexing signal faithfully reflected by the output signal of cohered oscillator 34, whereas the phase of the output signal of cohered oscillator 23 is representative, and indeed determinative of the phase of the auxiliary vertical deflection signal produced by circuits 24, these respective output signals of cohered oscillators 23 and 34 may be compared to determine both the magnitude and the sense of their relative phase variations, which have been shown to be a measure of the accuracy of main vertical beam deflection. To put this information into useful form, the output signals of the two cohered oscillators are simultaneously supplied to the two input circuits of a conventional phase comparator 35, which is operative in well known manner to produce a unidirectional output potential proportional to the instantaneous phase difference between the signals from cohered oscillators 23 and 34. It is then a simple matter to utilize this output potential of phase comparator 35 to produce a deflection current in correction coil 36 of sufficient magnitude to counteract all departures of the vertical beam deflection from its desired value. For this purpose it suffices to determine the constant value of phase difference between signals from cohered oscillators 23 and 34 which corresponds to the proper vertical deflection condition on tube screen 19 and to proportion the phase comparator 35 in such a manner as to produce no corrective output potential when this particular phase difference between the cohered oscillator output signals prevails. Furthermore, the phase comparator may be arranged to produce a current flow through correction coil 36 which is of such polarity as to deflect the cathode ray beam additionally downward whenever the phase of the signal from cohered oscillator 34 advances with respect to the phase of a signal from cohered oscillator 23, while producing a current flow of the opposite polarity whenever the signal from cohered oscillator 34 is delayed with respect to that from cohered oscillator 23. It will be understood, of course, that additional D.-C. amplification may be provided between the output of phase comparator 35 and correction coil 36 as required.

Note, in this connection, that separate coils have been shown in Figure 1 for purposes of main vertical deflection, auxiliary vertical deflection, and correction. When such separate coils are employed, it may be necessary to bunch them very closely together due to the limited space available along the cathode ray tube neck. In that event, precautions may have to be taken to prevent interaction between the various coils. This may be done by tuning the auxiliary deflection coil to the frequency of the auxiliary deflection signal, while tuning the correction coil to the much lower frequency range in which variations in the phase comparator output potential occur. Ordinarily, no special effort need be made to prevent interference with the main vertical deflection coil, since the latter is iron cored and therefore responsive only to the very low frequency vertical deflection signals. Alternatively, a special coil may be designed for combining the functions of all three coils shown.

The system hereinbefore described can now be seen to be operative to produce beam impingement upon a phosphor stripe emissive of light of one particular color always at the exact interval at which the received signal is representative of intelligence regarding this color. This is due to the fact that vertical deflection is accurately controlled, while actual beam impingement is independent of horizontal deflection and is, instead, dependent only on the auxiliary vertical deflection, this latter being in turn synchronized with the times and rate of occurrence of intelligence representative signal portions by means of the color synchronizing bursts.

Observe that the link between phase comparator 35 and the received color synchronizing burst is necessary only when it is contemplated that the rate of occurrence of intervals at which the received signal is representative of intelligence will not be substantially uniform. If that rate be uniform, then a stable local oscillator may be the source of auxiliary vertical deflection signals and may likewise be connected to phase comparator 35 to provide a reference for deviations in the phase of the index signal.

Several ancillary aspects of the invention now remain to be considered.

First it will be noted that the preceding discussion has been directed to a system in which the auxiliary deflection parallels the main vertical deflection and in which signals indicative of improper beam positioning are utilized to correct the rate of main vertical deflection. This is the preferred arrangement because control of a slowly varying parameter like the vertical deflection rate promotes greater accuracy. Nevertheless, substantial improvements over prior art arrangements can still be achieved by providing auxiliary beam deflection in a direction parallel to the main horizontal deflection, in which case correction of the main horizontal deflection rate must be effected. Beyond rotating the auxiliary deflection coil 24*a* and the correction coil 36 of Figure 1 through a 90° angle so as to produce horizontal instead of vertical deflection, the only change required for this modified operation is a readjustment of auxiliary deflection circuits 24 to produce a sawtooth current wave of sufficient amplitude to cause the beam to traverse horizontally a group of three adjacent phosphor stripes of the screen structure during each cycle of auxiliary deflection.

Note further that, in the system hereinbefore described, a certain signal output from indexing stripes 30 will be produced not only during the gradual upward deflection of the beam produced by the rising portion of the auxiliary deflection wave, but also during the extremely rapid downward passage of the beam across the index stripe due to the rapidly falling portion of this deflection wave. This latter signal will, however, be of extremely short duration, due to the fact that the beam impinges on the index stripes only very briefly during the falling portion of the auxiliary deflection cycle. The energy content of this signal will, therefore, be extremely low so that it will ordinarily be unable to affect the operation of the remainder of the system and particularly the phasing of cohered oscillator 34, as established by the phase of the indexing signal produced during the rising portion of the sawtooth wave. If the downward slope of the sawtooth auxiliary deflection wave is not as steep as here contemplated, then the beam may produce, during its downward traversal of the indexing stripe, a signal of duration and energy content comparable to that produced during its upward traversal of the indexing stripe. Such signals may improperly affect the phasing of oscillator 34 and it will, therefore be necessary to provide auxiliary means for blanking the beam during its downward deflection interval so that no signal at all will be produced by the index stripe during downward beam traversal thereof. The same reasoning applies to the spurious emission of red light from the color stripe 26, lying beneath index stripe 30, which may occur during the rapid downward return of the beam at the end of the auxiliary deflection cycle. Here, again, the duration of this light emission will be normally so small as to be unappreciable, but any disturbance caused thereby may again be eliminated by blanking of the beam during this return interval.

In fact, such blanking techniques make it feasible to use auxiliary deflection waveshapes other than the sawtooth wave hereinbefore contemplated. For example, the auxiliary deflection signal may take the form of a sinusoidal wave, during whose downward sloping portion the cathode ray beam may be blanked by a signal suitably delayed with respect to the beginning of each auxiliary deflection cycle. In any of these cases where blanking becomes necessary, this may be simply effected by deriving a signal indicative of the beginning of each auxiliary deflection cycle, delaying the signal so that it occurs at the time when blanking is required and then supplying the signal to electron beam intensity control grid 12 with such polarity as to cut off the electron beam during the required interval.

Let it also be understood, that the particular indexing arrangement hereinbefore described does not form an essential part of my invention. Numerous other arrangements are known for producing indications of electron beam impingement upon certain portions of a screen structure and any one of these may be used in a system embodying the invention. For example, it is possible to form certain of the color stripes themselves of a material having a different secondary electron emissivity than the remainder of the stripes. In that case, the separate indexing stripes shown in Figure 2 may be dispensed with. Furthermore, reliance on secondary electron emission phenomena may be avoided altogether, if desired, as it is perfectly feasible to derive suitable indexing signals from a photoelectric cell which views the screen structure through a filter transmissive of light of only one primary color emitted by the stripes.

It will be understood that numerous modifications, other than those hereinbefore suggested, will occur to those skilled in the art without departing from my inventive concept. I therefore desire the scope of the latter to be limited only by the appended claims.

I claim:

1. In a cathode ray tube display system: means for producing a signal comprising successive portions representative of different intelligence components, portions representative of particular components occurring in a predetermined order and recurring at a predetermined rate; a cathode ray tube for reproducing the intelligence represented by said signal, said tube comprising a source of an electron beam, and a fluorescent screen comprising a plurality of substantially parallelly disposed phosphor strips; means for deflecting said beam in a direction generally parallel to said phosphor strips and at a rate such as to cause said beam to traverse only a portion of the length of a given strip during one cycle of said signal; means for deflecting said beam in a direction generally transverse to said phosphor strips at a rate such as to cause said beam to traverse different strips during successive scans in said direction generally parallel to said strips; means for producing recurring auxiliary deflection of said electron beam in said direction generally transverse to said phosphor strips at a rate substantially equal to the rate of recurrence of said portions of said signal and of an amplitude sufficient to cause said beam to traverse substantially the width of a phosphor strip during each cycle of said deflection; means responsive to electron beam impingement on a predetermined region extending longitudinally of each said strip to produce a signal indicative of said impingement; and means for utilizing said produced signal to control the instantaneous rate of deflection of said beam in said direction generally transverse to said phosphor strips.

2. In a cathode ray tube display system: means for producing a signal comprising successive portions representative of different intelligence components, portions representative of particular components occurring in a predetermined order and recurring at a predetermined rate; a cathode ray tube for reproducing the intelligence represented by said signal, said tube comprising a source of an electron beam, a fluorescent screen comprising a plurality of substantially parallelly disposed phosphor strips and a plurality of indexing stripes, each associated with one of said phosphor strips and disposed substantially parallel thereto; means for deflecting said electron beam in a direction generally parallel to said phosphor strips and at a rate such as to cause said beam to traverse only a portion of the length of a given strip during one cycle of said signal; means for deflecting said electron beam in a direction generally transverse to said phosphor strips at a rate such as to cause said beam to traverse different strips during successive scans in said direction generally parallel to said strips; means for producing recurrent auxiliary deflection of said electron beam in said direction generally transverse to said phosphor strips at a rate substantially equal to the rate of recurrence of said portions of said signal and of an amplitude sufficient to cause said beam to traverse substantially the width of a phosphor strip and to traverse the indexing stripe associated with a strip during each cycle of said deflection; means for deriving a signal in response to impingement of said electron beam on said indexing stripes; and means for utilizing said derived signal to control the instantaneous rate of deflection of said beam in said direction generally transverse to said phosphor strips.

3. In a cathode ray tube display system: means for producing a signal comprising successive portions representative of different intelligence components occurring in a predetermined order and recurring at a predetermined rate; a cathode ray tube for producing visible indications of the intelligence represented by said signal, said tube comprising a screen and means for projecting an electron beam toward said screen; means for deflecting said beam in first and second different directions across said screen and at rates such as to trace successively a plurality of substantially parallel paths upon said screen; a plurality of phosphor strips, each disposed longitudinally of one of said beam paths upon said screen; a plurality of indexing stripes, each associated with one of said phosphor stripes and disposed substantially parallel thereto; means for producing cyclical deflection of said beam across said screen in said first direction at a rate substantially equal to said rate of recurrence of particular portions of said signal and of an amplitude sufficient to cause said beam to traverse the width of a phosphor strip and the indexing stripe associated with said strip during each cycle of said deflection; means for deriving a signal in response to impingement of said beam on said indexing stripes; and means for utilizing said derived signal to control the rate of beam deflection in said first direction.

4. In a cathode ray tube display system, means for producing a signal comprising successive portions representative of different intelligence components occurring in a predetermined order and recurring at a predetermined rate; a cathode ray tube for producing visible indications of the intelligence represented by said signal, said tube comprising a screen and means for projecting an electron beam toward said screen; means for deflecting said beam in first and second mutually perpendicular directions across said screen and at rates such as to trace successively a plurality of substantially parallel paths upon said screen; a plurality of phosphor strips, each disposed longitudinally of one of said beam paths upon said screen; a plurality of indexing stripes, each associated with one of said phosphor stripes and disposed substantially parallel thereto; means for producing cyclical deflection of said beam across said screen in said first direction at a rate substantially equal to said rate of recurrence of particular portions of said signal and of an amplitude sufficient to cause said beam to traverse the width of a phosphor strip and the indexing stripe associated with said strip during each cycle of said deflection; means for deriving a signal in response to impingement of said beam on said indexing stripes; and means for utilizing said derived signal to control the rate of beam deflection in said first direction.

5. In a cathode ray tube display system: means for producing a signal having successive portions representative of different intelligence components occurring in a predetermined order and recurring at a predetermined rate; a cathode ray tube for producing visible indications of the intelligence represented by said signal, said tube comprising a screen, means for projecting an electron beam toward said screen, and means responsive to said signal to control the intensity of said beam, said screen having a plurality of substantially parallel phosphor strips and a plurality of indexing stripes, each associated with one of said strips and disposed substantially parallel thereto; means for producing successive deflections of said beam longitudinally of different ones of said phosphor strips at such a rate as to cause said beam to traverse only a fraction of the length of a particular strip during one cycle of said signal; means for producing cyclically recurrent deflections of said beam transversely of said phosphor strips at a rate substantially equal to the said rate of recurrence of signal portions and of an amplitude sufficient to cause said beam to traverse the width of a phosphor strip and its associated indexing stripe during each cycle of said transverse deflections; means for deriving a signal in response to impingement of said electron beam on said indexing stripes; and means for utilizing said derived signal to control the deflection of said beam transversely of said phosphor strips.

6. In a cathode ray tube display system: means for producing a signal having successive portions representative of different intelligence components occurring in a predetermined order and recurring at a predetermined rate; a cathode ray tube for producing visible indications of the intelligence represented by said signal, said tube comprising a screen, means for projecting an electron beam toward said screen, and means responsive to said intelligence signal to control the intensity of said beam, said screen having a plurality of substantially parallel phosphor strips and a plurality of indexing stripes, each associated with one of said strips and disposed substantially parallel thereto; means for producing successive deflections of said beam longitudinally of different ones of said phosphor strips at such a rate as to cause said beam to traverse only a fraction of the length of a particular strip during one cycle of said signal; means for producing cyclically recurrent deflections of said beam transversely of said phosphor strips at a rate substantially equal to the said rate of recurrence of signal portions and of an amplitude sufficient to cause said beam to traverse the width of a phosphor strip and its associated indexing stripe during each cycle of said transverse deflection; means for deriving a signal in response to impingement of said electron beam on said indexing stripes; means responsive to variations in the times of occurrence of the said derived signal to produce a control signal; and means for utilizing said control signal to control the deflection of said beam transversely of said phosphor strips.

7. In a cathode ray tube display system: means for producing a signal having successive portions representative of different intelligence components occurring in a predetermined order and recurring at a predetermined rate; a cathode ray tube for producing visible indications of the intelligence represented by said signal, said tube comprising a screen, means for projecting an electron beam toward said screen, and means responsive to said signal to control the intensity of said beam, said screen having a plurality of substantially parallel phosphor strips and a plurality of indexing stripes, each associated with one of said strips and disposed substantially parallel thereto; means for producing successive deflections of said beam longitudinally of different ones of said phosphor strips at such a rate as to cause said beam to traverse only a fraction of the length of a particular strip during one cycle of said signal; means for producing cyclically recurrent deflections of said beam transversely of said phosphor strips at a rate substantially equal to the said rate of recurrence of signal portions and of an amplitude sufficient to cause said beam to traverse the width of a phosphor strip and its associated indexing stripe during each cycle of said transverse deflection; means for deriving a pulse signal in response to each impingement of said electron beam on any one of said indexing stripes; means supplied with said derived pulse signals and responsive thereto to produce a continuous sinusoidal signal having substantially the same frequency and phase characteristics as the said pulse signals; and means for sensing variations in the phase of said sinusoidal signal and for controlling the deflection of said beam transversely of said phosphor strips in proportion to said variations.

8. In a cathode ray tube display system: means for producing a first signal having successive portions representative of different intelligence components occurring in a predetermined order and recurring at a predetermined rate; a source of a second signal whose phase and frequency are respectively indicative of the times of occurrence and the rate of recurrence of the said intelligence representative portions of said first signal; a cathode ray tube for producing visible indications of the intelligence represented by said first signal, said tube comprising a screen, means for projecting an electron beam toward said screen, and means responsive to said signal to control the intensity of said beam, said screen having a plurality of substantially parallel phosphor strips and a plurality of indexing stripes, each associated with one of said strips and disposed substantially parallel thereto; means for producing successive deflections of said beam longitudinally of different ones of said phosphor strips at such a rate as to cause said beam to traverse only a fraction of the length of a particular strip during one cycle of said first signal; means for producing cyclically recurrent deflections of said beam transversely of said phosphor strips at a rate substantially equal to the said rate of recurrence of signal portions and of an amplitude sufficient to cause said beam to traverse the width of a phosphor strip and its associated indexing stripe during each cycle of said transverse deflections; means for deriving a signal in response to impingement of said electron beam on said indexing stripes; means supplied with said second signal and with said derived signal and responsive to relative phase variations therebetween to produce a control signal proportional to said variations; and means for utilizing said control signal to control the deflection of said beam transversely of said phosphor strips.

9. In a cathode ray tube display system: means for producing a signal having successive portions representative of intelligence respecting different color components occurring in a predetermined order and recurring at a predetermined rate; a cathode ray tube for producing visible indications of said color components, said tube comprising a screen, means for projecting an electron beam toward said screen, and means responsive to said intelligence signal to control the intensity of said beam, said screen including a plurality of substantially parallelly disposed groups of phosphor stripes, each of said groups including different stripes responsive to electron beam impingement to produce light of said different colors, different color stripes being disposed in the same order within each said group in which the said successive signal portions are representative of different color components, and a plurality of indexing stripes, each associated with one of said groups of phosphor stripes and disposed substantially parallel thereto; means for producing successive deflections of said beam longitudinally of different ones of said phosphor stripe groups at such a rate as to cause said beam to traverse only a portion of the length of a particular group during one cycle of said signal; means for producing cyclically recurrent deflections of said beam transversely of said phosphor stripe groups at a rate substantially equal to the said rate of recurrence of signal portions and of an amplitude sufficient to cause said beam to traverse all the phosphor stripes of a group and the indexing stripe associated therewith during each cycle of said transverse deflections; means for deriving a signal in response to impingement of said electron beam upon said indexing stripes; and means for utilizing said derived signal to control the deflection of said beam transversely of said groups.

10. In a cathode ray tube display system: means for producing a signal having successive portions representative of red, green and blue color components occurring in a predetermined order and recurring at a predetermined rate; a cathode ray tube for producing visible indications of said intelligence, said tube comprising a screen, means for projecting an electron beam toward said screen and means responsive to said intelligence signal to modulate the intensity of said beam, said screen including a plurality of substantially parallelly disposed groups of phosphor stripes, each group comprising a red, a green and a blue light emissive stripe arranged in the same order as the said order of occurrence of color representative signal portions, and a plurality of indexing stripes, each associated with one of said groups of phosphor stripes and disposed substantially parallel thereto; means for producing successive deflections of said beam across said screen longitudinally of different ones of said phosphor stripe groups; means for producing cyclically recurrent deflections of said beam transversely of said groups at a rate substantially equal to the said rate of recurrence of signal portions, of amplitude such as to traverse a red, a green and blue light emissive phosphor stripe and an indexing stripe during each cycle of said last-named deflections, and in such sense as to traverse said stripes in the order in which the said signal portions are representative of different color components; means for deriving a signal in response to impingement of said electron beam on said indexing stripes; and means for utilizing said derived signal to control the deflection of said beam transversely of said phosphor stripes.

ROBERT C. MOORE.

References Cited in the file of this patent

UNITED STATES PATENTS

| Number | Name | Date |
| --- | --- | --- |
| 2,431,115 | Goldsmith | Nov. 18, 1947 |
| 2,530,431 | Huffman | Nov. 21, 1950 |
| 2,587,074 | Szaklai | Feb. 26, 1952 |